US012064073B2

(12) United States Patent
Jafarzadeh

(10) Patent No.: US 12,064,073 B2
(45) Date of Patent: Aug. 20, 2024

(54) PORTABLE HANDHELD SUBMERSIBLE ULTRASONIC CLEANING DEVICE

(71) Applicant: COSMETIC EDGE PTY LTD, Kew (AU)

(72) Inventor: Masoud Tahghighi Jafarzadeh, Kew (AU)

(73) Assignee: COSMETIC EDGE PTY LTD, Kew (AU)

( * ) Notice: Subject to any disclaimer, the term of this patent is extended or adjusted under 35 U.S.C. 154(b) by 152 days.

(21) Appl. No.: 17/635,666

(22) PCT Filed: Aug. 17, 2020

(86) PCT No.: PCT/AU2020/050856

§ 371 (c)(1),
(2) Date: Feb. 15, 2022

(87) PCT Pub. No.: WO2021/030863

PCT Pub. Date: Feb. 25, 2021

(65) Prior Publication Data

US 2022/0338707 A1 Oct. 27, 2022

(30) Foreign Application Priority Data

Aug. 16, 2019 (AU) ................................ 2019902971

(51) Int. Cl.
*A47L 15/13* (2006.01)
*A47L 15/00* (2006.01)
(Continued)

(52) U.S. Cl.
CPC ........... *A47L 15/13* (2013.01); *A47L 15/0086* (2013.01); *A47L 15/4436* (2013.01); *A47L 15/46* (2013.01);
(Continued)

(58) Field of Classification Search
CPC ....... A47L 15/13; A47L 15/0086; B08B 3/12; D06F 7/02; D06F 7/04
See application file for complete search history.

(56) References Cited

U.S. PATENT DOCUMENTS 5,697,230 A * 12/1997 Ender .................... H02K 33/16
366/127
2006/0185402 A1 * 8/2006 Wang ...................... D06F 19/00
134/198

(Continued)

FOREIGN PATENT DOCUMENTS

CN 106592148 A * 4/2017
DE 29520991 U1 7/1996

(Continued)

OTHER PUBLICATIONS

Machine translation: CN106592148; Wu, C. (Year: 2017).*

(Continued)

*Primary Examiner* — Natasha N Campbell
(74) *Attorney, Agent, or Firm* — INNOVATION CAPITAL LAW GROUP, LLP; Vic Lin

(57) ABSTRACT

A portable handheld submersible ultrasonic cleaning device has a generally elongate body defining proximal and distal ends, a power supply and an ultrasonic transducer powered thereby, wherein the distal end exposes the ultrasonic transducer to agitate surrounding water when the base is submerged in the water use. A propeller device comprising a propeller may force the water across the ultrasonic transducer. When cleaning, the device may be held with the distal end thereof submerged for enhanced cleaning and removing surface contaminants such as dust, dirt, oil, pigments, bacteria and the like. The device may be stood upright upon the base on the floor of a container for hands-free application of ultrasound whilst cleaning.

38 Claims, 3 Drawing Sheets

(51) Int. Cl.

| | |
|---|---|
| ***A47L 15/44*** | (2006.01) |
| ***A47L 15/46*** | (2006.01) |
| ***B08B 3/08*** | (2006.01) |
| ***B08B 3/12*** | (2006.01) |
| ***D06F 7/04*** | (2006.01) |
| ***D06F 33/36*** | (2020.01) |
| *D06F 103/16* | (2020.01) |
| *D06F 105/56* | (2020.01) |

(52) U.S. Cl.

CPC .................. *B08B 3/08* (2013.01); *B08B 3/12* (2013.01); *D06F 7/04* (2013.01); *D06F 33/36* (2020.02); *A47L 2401/023* (2013.01); *A47L 2401/12* (2013.01); *A47L 2501/28* (2013.01); *A47L 2501/36* (2013.01); *A47L 2601/17* (2013.01); *D06F 2103/16* (2020.02); *D06F 2105/56* (2020.02)

(56) References Cited

U.S. PATENT DOCUMENTS

2006/0191562 A1* 8/2006 Nunomura ................ B08B 3/02
134/198
2010/0141104 A1* 6/2010 Beaudet .............. A47L 15/4293
16/412

FOREIGN PATENT DOCUMENTS

| | | | | | |
|---|---|---|---|---|---|
| JP | H0591473 | U | * | 12/1993 | |
| KR | 20030077514 | A | | 10/2003 | |
| KR | 200383513 | Y1 | | 5/2005 | |
| KR | 200414200 | Y1 | | 4/2006 | |
| KR | 20060110452 | A | | 10/2006 | |
| KR | 20070071536 | A | | 7/2007 | |
| KR | 200482565 | Y1 | * | 2/2017 | |
| KR | 101881798 | B1 | | 7/2018 | |
| WO | WO-9427479 | A1 | * | 12/1994 | ......... A47G 23/0241 |

OTHER PUBLICATIONS

Machine translation: KR200482565 (Year: 2017).*
Machine translation: JP H0591473 (Year: 1993).*
International Search Report & Written Opinion dated Oct. 26, 2020 from corresponding PCT Application No. PCT/AU2020/050856, 11 pages.

* cited by examiner

PORTABLE HANDHELD SUBMERSIBLE ULTRASONIC CLEANING DEVICE

FIELD OF THE INVENTION

This invention relates generally to a portable handheld submersible ultrasonic cleaning device which may be used for enhanced cleaning of household items.

SUMMARY OF THE DISCLOSURE

There is provided herein a portable handheld submersible ultrasonic cleaning device that that uses ultrasound (usually from 20-40 kHz) to agitate fluid for various household cleaning applications including cutlery and crockery, clothing jewellery and the like.

The device comprises a generally elongate body defining proximal and distal ends, a rechargeable power supply therein and an ultrasonic transducer (such as a piezoelectric transducer operating between 20 and 40 kHz) powered by the power supply. The distal end exposes the ultrasonic transducer to agitate surrounding water when the base is submerged.

The device generates compression waves in the liquid of the container (such as a kitchen sink the like) which induces micro-cavitation bubbles which collapse with high energy which may exceed temperatures of 5,000 K and pressures of 135 MPa but which are so small so as to only clean and remove surface dirt and contaminants.

The elongate body may be held by the proximal end like a wand in use. Furthermore, the body may stand upright whilst submerged upon a base thereof for hands-free operation.

The base may be interiorly open and skirt an impeller which turns to thrust water intake across the ultrasonic transducer located thereabove. The base may allow water flow therethrough above the impeller such that water and ultrasound may propagate radially therefrom.

The ultrasonic transducer may surround a impeller shaft and may be annular to maximise surface contact area. Furthermore, this configuration, the ultrasonic transducer may be raised from the floor of the water container, thereby allowing for adequate propagation of ultrasound.

The device may further comprise a removable detergent tray to hold dissolvable detergent tablets.

The base may define open side intake port through which water may flow to the impeller when the device is free standing on the base.

As such, for example, when cleaning kitchen cutlery and crockery, the device may be held with the distal end thereof submerged for enhanced cleaning and removing surface contaminants such as dust, dirt, oil, pigments, bacteria and the like. The device may be stood upright upon the base on the floor of the sink for hands-free application of ultrasound whilst cleaning.

The device may comprise a control interface for controlling a cleaning mode of operation of the device. For example, different cleaning modes of operations may be provided for differing types of items or surface contaminants wherein the controller adjusts the operational frequency of the ultrasonic transducer. For example, controller modes of operations may be set for cleaning cutlery and crockery or clothing. Furthermore, the controller modes of operation may be set for cleaning dust, wax, grease, wine stains or the like.

The device may comprise various sensors for detecting water immersion and/or water temperature for controlling at least one of the operation, frequency and duration of the ultrasonic transducer.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

A portable handheld submersible ultrasonic cleaning device 100 comprises a generally elongate body 101 defining a proximal end 102 and a distal end 103. The device 100 is generally sized and shaped to be conveniently held like a wand by the proximal end 102 wherein the distal end 103 can be held submerged within water in a water container such as a sink or the like for enhanced cleaning of various types of items therein. The body 101 may be designed to stand upright for hands-free operation.

Figure 2:
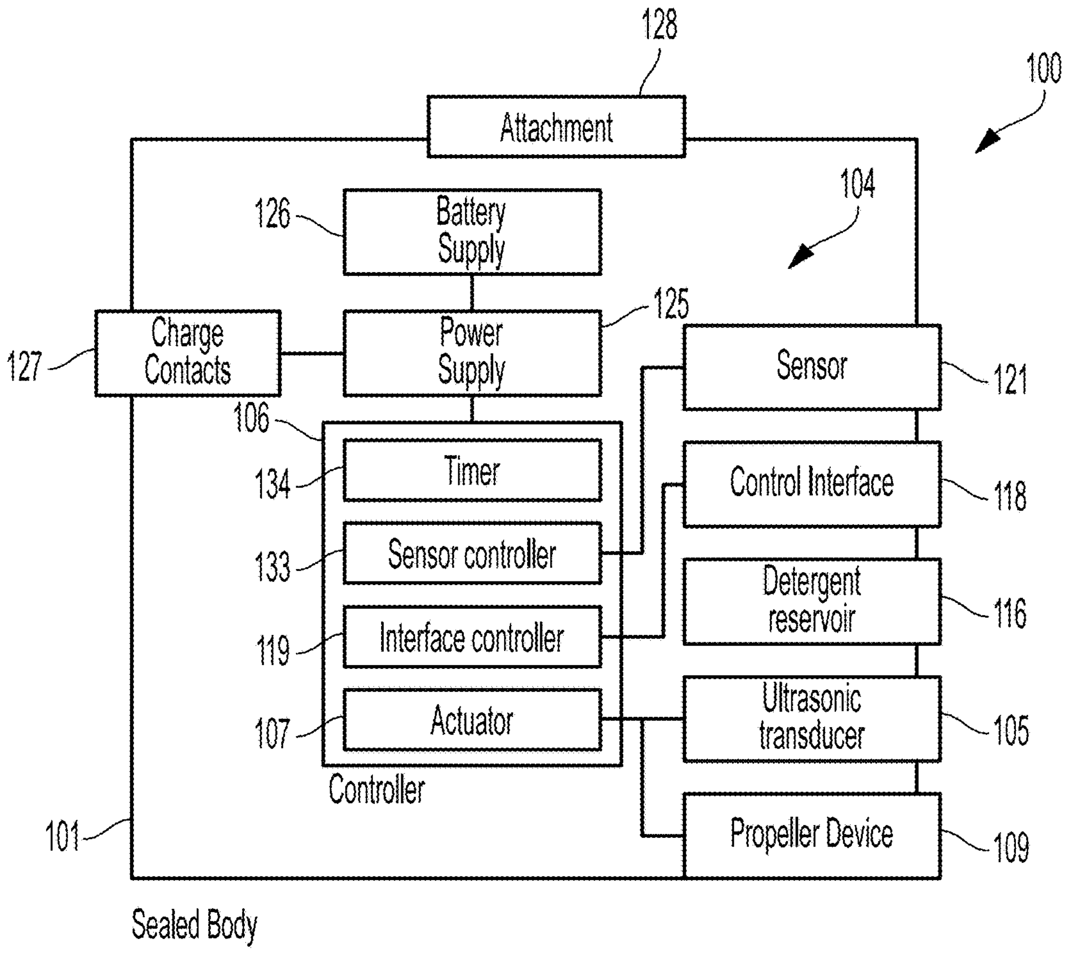
FIG. 2 shows a control system for the device in accordance with an embodiment.

FIG. 2 shows a control system 104 of the device 100 located within the body 101.

The device 100 comprises an ultrasonic transducer 105 exposed at the distal end 103 to agitate surrounding water when the distal end 103 is submerged. The control system 104 may comprise a controller 106 operably controlling the ultrasonic transducer 105. The controller 106 may take the form of a Field Programmable Gate Arrays (FPGA) microcontroller executing firmware for the operational control of the device 100 in the manner described herein.

The ultrasonic transducer 105 may be piezoelectric. Furthermore, the ultrasonic transducer 105 may operate between 20 and 40 kHz. In embodiments as will be described in further detail below, the controller 106 may adjust the operational frequency of the ultrasonic transducer 105 depending on the cleaning mode of operation.

The device 100 may comprise a power supply 125 powering the controller 106 and ultrasonic transducer 105 from internal rechargeable battery supply 126. The device 100 may comprise electrical charge contacts 127 for recharging the rechargeable battery supply 126. Alternatively, the device may recharge via inductive coupling. The device 100 may comprise an attachment 128 for holding the device 100 when not in use.

In this regard, the controller 106 may comprise an actuator 107 which controls the ultrasonic transducer 105.

Figure 3:
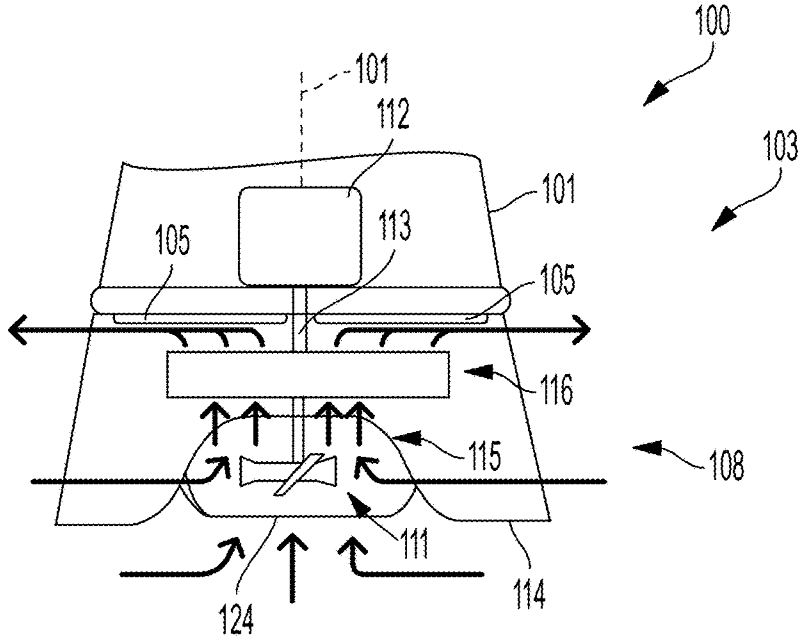
FIG. 3 shows an interior elevation view of the base of the device in accordance with an embodiment.
Figure 4:
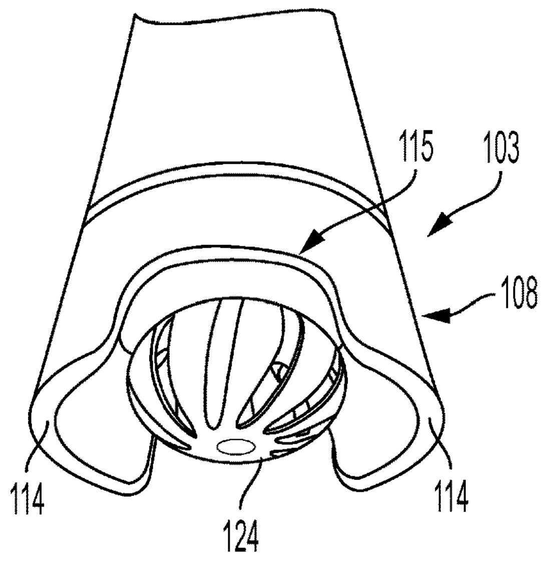
FIG. 4 shows an underside perspective view of the base of the device.

In a preferred embodiment, the device 100 further comprises an impeller device 109 which forces water across the ultrasonic device 105. With reference to FIG. 3, the impeller device 109 may comprise an electric motor 112 turning an impeller 111 by a shaft 113. The impeller device 109 may also be controlled by the actuator 107.

With reference to FIG. 3, the distal end 103 of the device 100 may comprise an interiorly open base 108 skirting the impeller 111. The shaft 113 of the impeller device 119 may be orientated along a longitudinal axis 110 of the body 101.

The impeller 111 may be shrouded within the cage 124.

The ultrasonic transducer 105 may be located proximally (i.e. more towards the proximal end 102 or above) with respect to the impeller 111 such that the impeller 111 draws the water in distally and forces the water substantially parallel with the elongate axis 110 of the body 101 onto the ultrasonic transducer 105 in the manner shown in FIG. 3. As is also shown in FIG. 3, the ultrasonic device 105 may be located around the shaft 113. In an embodiment, the ultrasonic device 105 is annular so as to maximise surface area within the base 108.

The base 108 preferably allows water flow therethrough above the impeller 109 such that water and ultrasound may disburse/propagate radially in the manner shown.

In this regard, the base 108 may comprise a series of peripheral ports proximal (i.e. above) with respect to the impeller 109 through which the water escapes. In alternative embodiments, the entire or a portion of the base 108 may comprise mesh (such as stainless-steel mesh) through which the water can flow.

Figure 1:
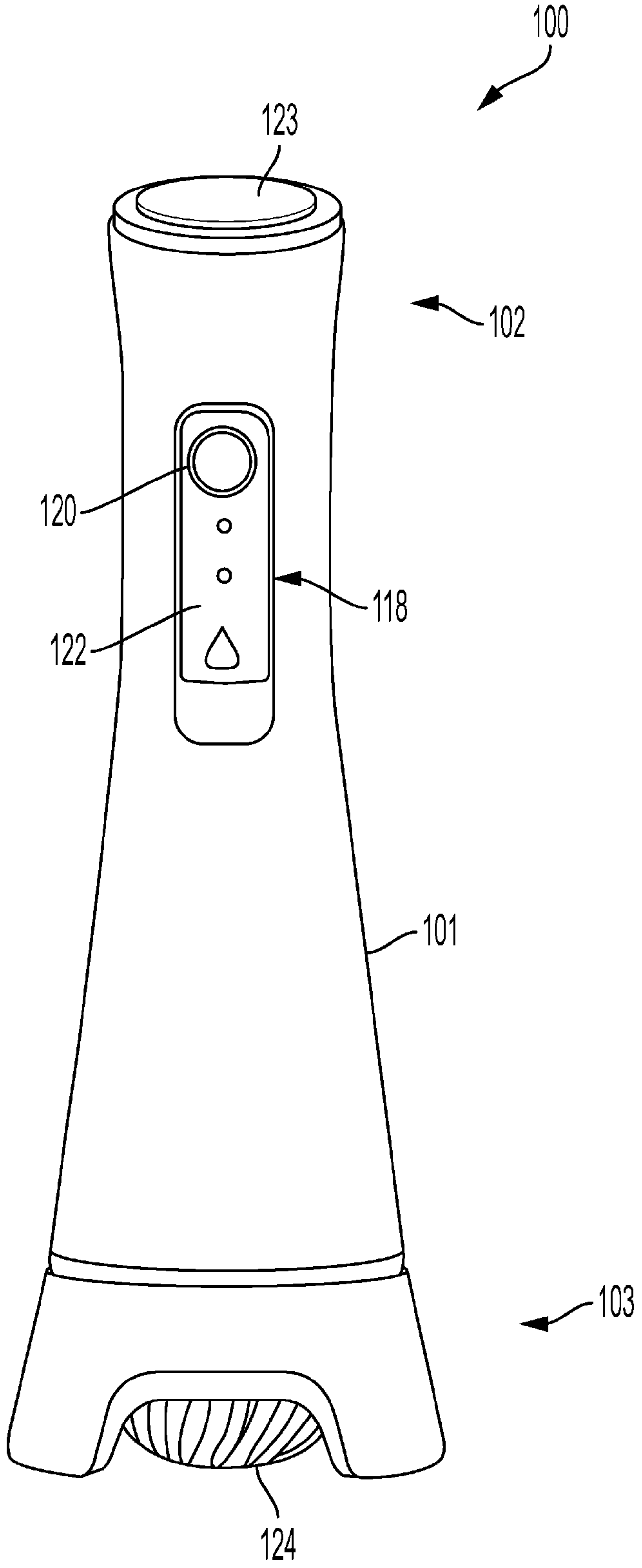
FIG. 1 shows a front perspective view of a portable handheld submersible ultrasonic cleaning device in accordance with an embodiment.

The base 108 may define an undersurface 114 upon which the device 100 may stand perpendicularly atop a surface in the manner shown in FIG. 1 for hands-free mode operation.

Furthermore, the base 108 may define side inlet ports 115 through which the water may be drawn into the base 108 by the impeller 111. In the embodiment shown, the base 108 is generally frustoconical and comprises two opposing side inlet ports 115.

Figure 5:
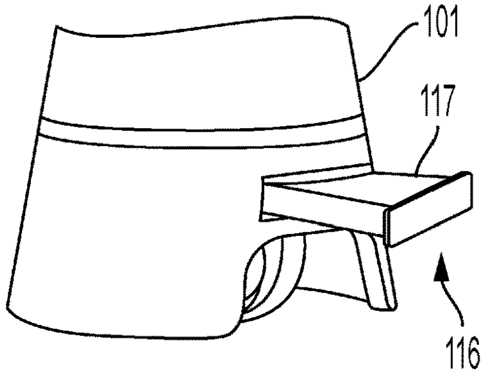
FIG. 5 shows a side perspective view of a removable detergent tray of the device.

The base 108 may further comprise a detergent dispenser 116 for holding and dispensing detergent. With reference to FIG. 5, the detergent dispenser 116 may comprise a tray 117 which can be pulled from a side of the body 101 for loading of detergent therein. Preferably, the tray 117 holds dissolvable detergent tablets which gradually dissolve. The tray 117 may comprise a series of apertures therethrough through which the water may flow.

As shown in FIG. 3, the detergent dispenser 116 may locate between the impeller 111 and the ultrasonic device 105 so as to dispense detergent into the flow of water thrust by the impeller 111 onto the ultrasonic transducer 105.

The tray 117 may comprise a tray interface, such as an electrical contact switch or the like operably coupled to the controller 106 such that the controller 106 can detect opening and closing of the tray 117 so as to determine and indicate when detergent requires replenishment. For example, the timer 106 may record operational time since the opening of the tray 117 so as to provide an indication when the device 100 has been operated for a period of time since the opening of the tray 117. In embodiments, the controller 106 may adjust the timing calculation depending on the rotation rate of the impeller 111 wherein, the greater the average rotational speed of the impeller 111, the greater the depletion of the detergent and therefore the sooner replenishment thereof is required.

In alternative embodiments, the device 100 may dispense liquid detergent wherein the body 101 conceals a liquid detergent reservoir therein (not shown) comprising a conduit leading from the liquid detergent reservoir to the base 108.

With reference to FIG. 2, the device 100 may comprise a control interface 118 controlled by an interface controller 119. With reference to FIG. 1, the control interface 118 may comprise a series of pushbuttons and/or indicators.

In the embodiment shown, the control interface 118 comprise a cleaning mode of operation indicator 119 which indicates a cleaning mode of operation of the device 100. As alluded to above, cleaning modes of operation may accord to different types of items being cleaned and/or different types of surface contaminants. Furthermore, the control interface 118 may comprise a time remaining indicator 120 (which may be controlled by one or more timers 134 of the controller 106) which may indicate remaining time of a cleaning mode of operation. In embodiments, a proximal face 123 of the proximal end 102 may be able to be depressed or is touch sensitive to step through various modes of operation.

Depending on the mode of operation, the controller 106 may control at least one of the frequency of the ultrasonic transducer 105, the operational duration of the ultrasonic transducer 105 and the speed of the impeller 111. In embodiments, the speed of the impeller 111 may be adjusted to control the amount of detergent released by the detergent dispenser 116.

In embodiments, the controller 106 may comprise a sensor controller 113 interfacing one are more sensors 121 for controlling the operation of the device 100. The sensor 101 may comprise a electrodes used for detecting electrical continuity when the distal end 103 is immersed in water so that the controller 106 only operates the ultrasonic transducer 105 or automatically operates the ultrasonic transducer 105 when the distal end 103 is submerged.

Additionally, alternatively, the sensors 121 may sense water temperature so that the controller 106 may control at least one of operational frequency of the ultrasonic transducer 105, operational duration of the ultrasonic transducer 105 and speed or operation of the impeller 111.

Figure 6:
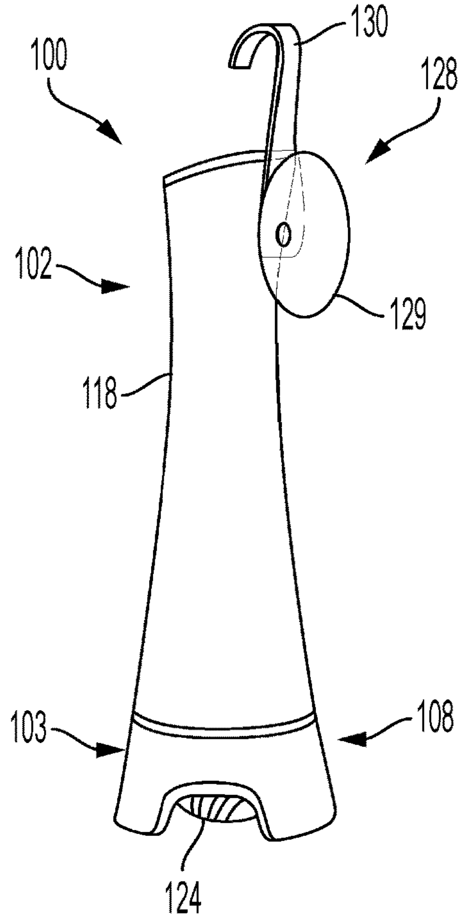
FIG. 6 shows a rear perspective view of the device comprising an attachment.
Figure 7:
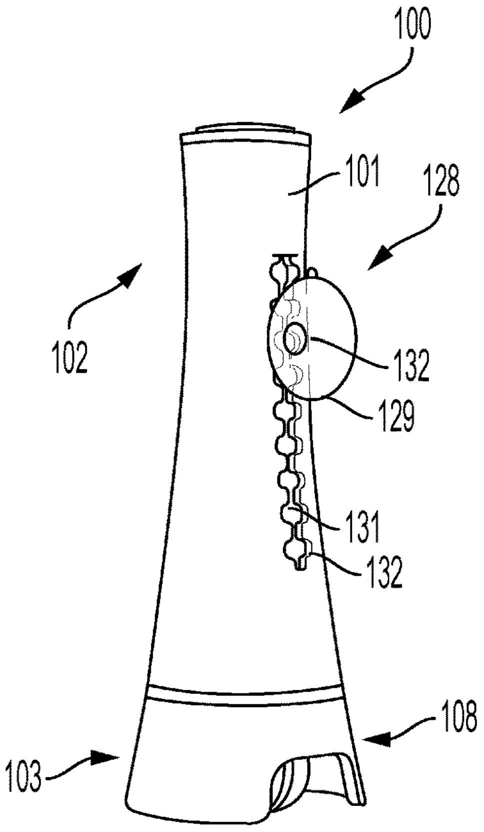
FIG. 7 shows a rear perspective view of the device comprising a further attachment in accordance with a further embodiment.

FIG. 6 shows an embodiment wherein the attachment 128 comprises a suction cup 129 for attachment of the device 100 to a vertical surface, such as a kitchen tile or glass window. The attachment 128 may additionally or alternatively comprise a hook 130 for hanging the device 100, such as from a kitchen tap or the like. FIG. 7 shows an alternative embodiment wherein the suction cup 129 travels along a track 131 along the longitudinal axis 110 of the body 101. The track 131 may comprise a plurality of spaced apart widened areas 131 within which the base stem 132 of the suction cup 129 tends to locate.

The present device 100 may be used in various water containers including kitchen, laundry sinks and the like and other types of water containers, such as buckets, hand bowls, Jacuzzis and the like.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A portable handheld submersible ultrasonic cleaning device comprising a generally elongate body defining proximal and distal ends, a power supply and an ultrasonic transducer powered thereby, wherein the distal end exposes the ultrasonic transducer to ultrasonically agitate surrounding water when a base thereof is submerged in the water in use, wherein the ultrasonic transducer is located proximally with respect to an impeller and wherein the impeller forces the water onto the ultrasonic transducer, wherein the distal end defines a base skirting the impeller and wherein a periphery of the base being proximally located with respect to the impeller allows radial water flow therethrough.

2. The device as claimed in claim 1, wherein the ultrasonic transducer is offset proximally from an undersurface of the distal end.

3. The device as claimed in claim 1, wherein the periphery comprises a plurality of ports through which water and ultrasound may propagate.

4. The device as claimed in claim 1, wherein the periphery comprises mesh.

5. The device as claimed in claim 4, wherein the entire base comprises mesh.

6. The device as claimed in claim 1, wherein the base defines an undersurface upon which the device can stand upright on a surface thereunderneath.

7. The device as claimed in claim 6, wherein the undersurface is orthogonal with respect to an elongate axis of the body.

8. The device as claimed in claim 6, wherein the base defines side intake ports through which the water can flow to the impeller past the undersurface.

9. The device as claimed in claim 1, wherein the impeller device comprises a shaft turning the impeller, the shaft orientated along an elongate axis of the body and wherein the ultrasonic transducer surrounds the shaft.

10. The device as claimed in claim 9, wherein the ultrasonic transducer is annular.

11. The device as claimed in claim 1, further comprising a detergent reservoir applying detergent to water forced by the impeller.

12. The device as claimed in claim 11, wherein the detergent reservoir comprises a tray located between the impeller and the ultrasonic transducer.

13. The device as claimed in claim 12, wherein the tray allows water to flow therethrough from the impeller to the ultrasonic transducer.

14. The device as claimed in claim 12, further comprising a dissolvable detergent tablet that fits the tray.

15. The device as claimed in claim 14, wherein the tray which is removable from a side of the body.

16. The device as claimed in claim 15, wherein the tray comprises a tray interface used to detect opening of the tray and wherein the device further comprises a controller operably coupled to the tray interface to determine and indicate when detergent replenishment is required.

17. The device as claimed in claim 1, further comprising a controller controlling the ultrasonic transducer and interfacing a control interface and wherein the control interface is operable to select a cleaning mode of operation from a set of cleaning modes of operations and wherein the controller is configured for adjusting the frequency of the ultrasonic transducer according to a selected mode of operation.

18. The device as claimed in claim 17, wherein the controller is further configured for adjusting an operating time of the ultrasonic transducer according to the selected mode of operation.

19. The device as claimed in claim 18, wherein the control interface comprises a time remaining indicator.

20. The device as claimed in claim 17, wherein the controller is further configured for controlling at least one of operation and speed of the impeller according to the selected mode of operation.

21. The device as claimed in claim 17, wherein the cleaning mode of operation is optimised for a type of item to be cleaned.

22. The device as claimed in claim 17, wherein the cleaning mode of operation is optimised for a type of surface contaminant.

23. The device as claimed in claim 17, wherein the control interface comprises a cleaning mode of operation indication.

24. The device as claimed in claim 17, wherein a proximal face of the device is at least one of able to be depressed and comprises a touch sensitive surface for selecting a cleaning mode of operation.

25. The device as claimed in claim 1, further comprising a controller controlling the ultrasonic transducer and a sensor operably coupled to the controller and wherein the controller controls the ultrasonic transducer according to sensing of the sensor.

26. The device as claimed in claim 25, wherein the sensor senses water immersion and wherein the controller is configured for at least one of only operating the ultrasonic transducer and automatically operating the ultrasonic transducer when the sensor senses water immersion.

27. The device as claimed in claim 25, wherein the sensor senses water temperature and wherein the controller is configured for controlling at least one of operation, operational frequency and duration of the ultrasonic transducer according to the water temperature.

28. The device as claimed in claim 27, wherein the controller is further configured for controlling at least one of operation and speed of impeller according to the water temperature.

29. The device as claimed in claim 1, wherein the ultrasonic transducer applies frequency at between 20 and 40 kHz.

30. The device as claimed in claim 1, wherein the ultrasonic transducer is piezoelectric.

31. The device as claimed in claim 1, further comprising an attachment comprising a suction cup.

32. The device as claimed in claim 31, further comprising a hook extending from the suction cup.

33. The device as claimed in claim 31, wherein a base stem of the suction cup travels along a track along the longitudinal axis of the body.

34. A method of operating a portable handheld submersible electronic device as claimed in claim 1, the method comprising inserting the distal end thereof into water within a container to agitate the water therein to assist in cleaning of items within the water.

35. The method as claimed in claim 28, wherein the base defines an undersurface upon which the device can stand upright on a surface thereunderneath, wherein the base defines side intake ports through which the water can flow to the impeller past the undersurface, and wherein the method comprises standing the device upright on the base thereof on a floor of the container for hands-free mode of operation and wherein the impeller device takes in water via the side intake ports.

36. The method as claimed in claim 28, wherein the device further comprises a controller controlling the ultrasonic transducer and interfacing a control interface and wherein the control interface is operable to select a cleaning mode of operation from a set of cleaning modes of operations and wherein the controller is configured for adjusting the frequency of the ultrasonic transducer according to a selected mode of operation, the method further comprising using the control interface to select a cleaning mode of operation according to at least one of a type of item to be cleaned and a type of surface contaminant.

37. The method as claimed in claim 28, wherein the device further comprises:

an impeller device at the distal end comprising the impeller which forces the water across the ultrasonic transducer;

a detergent reservoir applying detergent to water forced by the impeller; and a dissolvable detergent tablet that fits the tray, wherein the detergent reservoir comprises a tray located between the impeller and the ultrasonic transducer, wherein the method further comprising loading the dissolvable detergent tablet onto the tray.

38. A portable handheld submersible ultrasonic cleaning device comprising:

a generally elongate body defining proximal and distal ends;

a power supply;

an ultrasonic transducer powered thereby; and an impeller device at the distal end comprising an impeller which forces the water across the ultrasonic transducer, wherein the distal end exposes the ultrasonic transducer to ultrasonically agitate surrounding water when a base thereof is submerged in the water in use, wherein the ultrasonic transducer is located proximally with respect to the impeller and wherein the impeller forces the water onto the ultrasonic transducer; and the base defines an undersurface upon which the device can stand upright on a surface thereunderneath.

* * * * *